April 1, 1924.
C. M. CONRADSON
CLUTCH MECHANISM
Filed Oct. 24, 1919  2 Sheets-Sheet 1
1,488,736
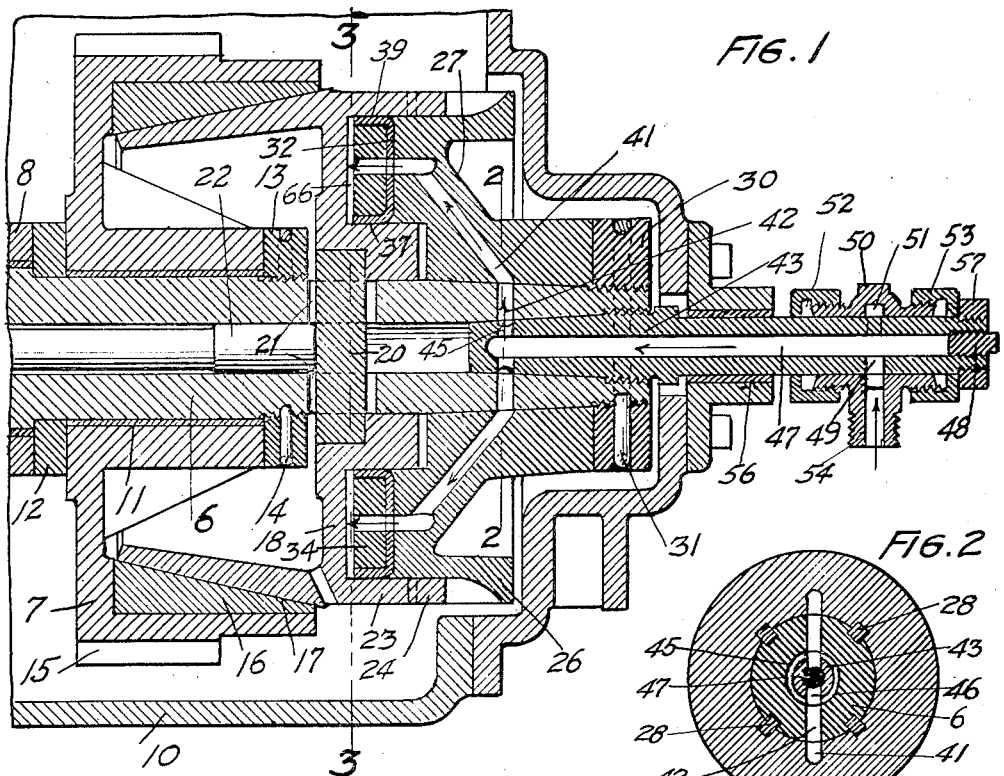
FIG.1
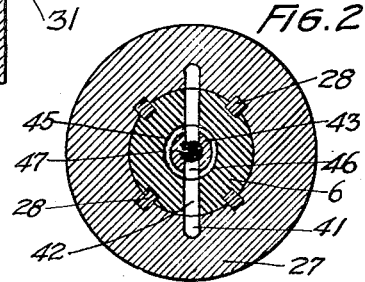
FIG.2
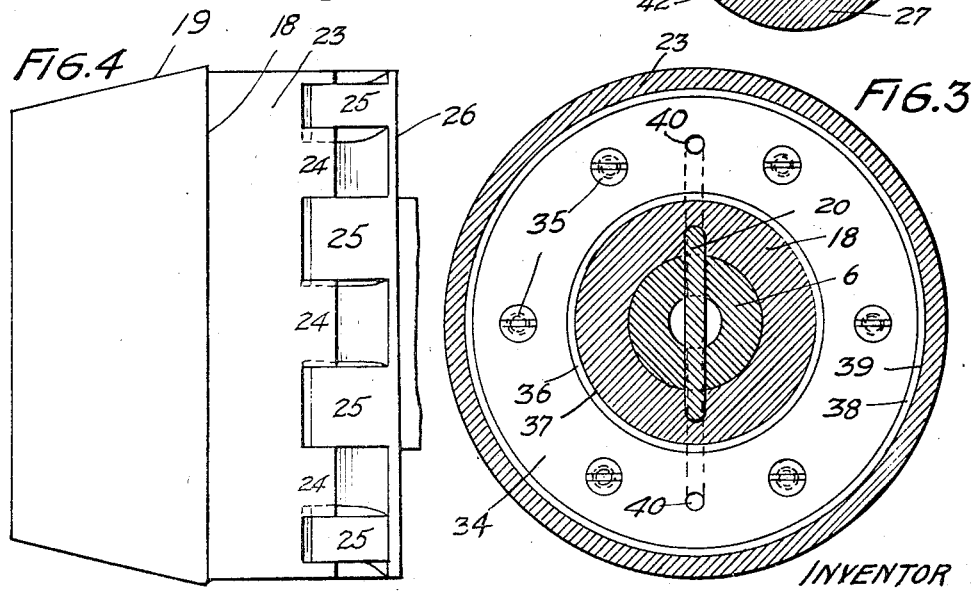
FIG.4
FIG.3
INVENTOR
CONRAD M. CONRADSON.
BY
HIS ATTORNEYS

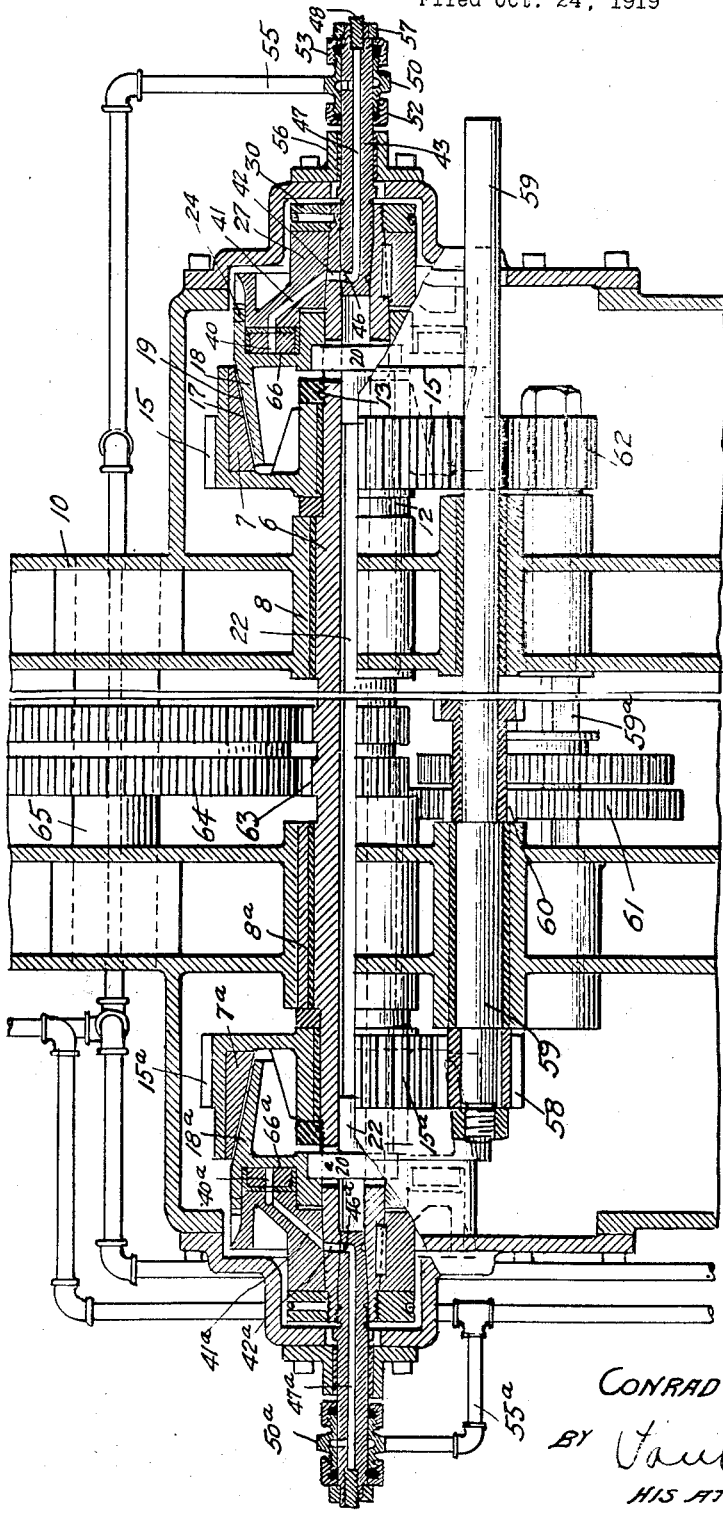

Patented Apr. 1, 1924.

1,488,736

UNITED STATES PATENT OFFICE.

CONRAD M. CONRADSON, OF MADISON, WISCONSIN, ASSIGNOR TO JOSEPH T. RYERSON & SON, OF CHICAGO, ILLINOIS, A CORPORATION OF ILLINOIS.

CLUTCH MECHANISM.

Application filed October 24, 1919. Serial No. 333,054.

*To all whom it may concern:*

Be it known that I, CONRAD M. CONRADSON, a resident of Madison, county of Dane, State of Wisconsin, have invented certain new and useful Improvements in Clutch Mechanisms, of which the following is a specification.

My invention relates to friction clutches of the type in which air under pressure is used as a force for actuating the clutch members.

The object of the invention is to provide a clutch mechanism of simple, durable and compact construction that will positively and instantly respond to the controlling medium in contacting and releasing the clutch members.

A further object is to provide a clutch mechanism for controlling speed changing and reverse gearing for various mechanisms, but particularly for the driving mechanism of machine tools, such as planers, shapers and the like, where quick, responsive and positive clutch action is essential.

A still further object is to provide means with a plurality of clutches, co-operating in action for starting, stopping or reversing certain mechanism, for positively preventing a clutch from being engaged before another is disengaged when the said clutches are on the same shaft and at opposite sides of a machine.

The invention consists generally in various constructions and combinations, all as hereinafter described and particularly pointed out in the claims.

In the accompanying drawings forming part of this specification,

Figure 1 is a longitudinal section through a clutch embodying my invention,

Figure 2 is a cross section on the line 2—2 of Figure 1,

Figure 3 is a similar section on the line 3—3 of Figure 1,

Figure 4 is a detached view of one of the clutch members illustrating the driving means therefor, Figure 5 is a longitudinal sectional view of the clutch mechanism, showing it applied to the driving and reversing gear of a planer.

As the two clutches shown in Figure 5 are identical in construction, a description of one of them as shown on a larger scale in Figure 1 and the remaining figures will answer for both, it being understood that the same reference numerals will be applied to identical parts in both clutches, but with the addition of the letter "a" where such is needed for clearness.

In the drawings, 6 represents the shaft upon which the clutch members 7 and $7^a$ are loosely mounted. The shaft 6 is hollow for reasons hereinafter set forth and is journaled in bearing boxes 8 and $8^a$ on a frame 10, which in the present case represents the frame of a planer.

Referring to Figure 1, the clutch member 7 is provided with a suitable bushing 11 and is held against longitudinal movement on said shaft by a thrust collar 12, bearing against the box 8 and a collar 13, threaded on the shaft 6 and held in place by a locking wire 14. The clutch member 7 is also provided with external gear teeth 15 by means of which it is driven and with an internal friction ring 16 secured firmly to the rim of the clutch member 7 and having the inverted conical clutch face 17. The movable clutch member 18, having a corresponding conical face 19 adapted for frictional clutch contact with the inverted face 17 of the ring 16, is slidably supported on the shaft 6 toward or from said face. A pin 20 passes through slots 21 in the hollow shaft 6 and its projecting ends are held in suitable recesses in the hub of the clutch member 18. A spacing rod 22 extends through the hollow space of the shaft 6 and is adjusted to engage the pins 20 and $20^a$ and to prevent the clutch members 18 and $18^a$ from contacting with the clutch members 7 and $7^a$ at the same time, while permitting either one of the clutches to be separately engaged.

In the neutral position of the clutches, as shown in Figure 5, both clutches are held in the released position by the rod 22, but a very slight movement in either direction on the shaft will throw either one or the other into clutching contact, as shown in Figure 1, the rod 22 sliding loosely through the hollow shaft 6.

I will now describe the means for throwing the clutch members into engagement and the method of driving the shaft 6 from either one of the clutches, it being understood that the clutches may be run at different speed or in a reverse direction, the latter being illustrated in the drawings.

Extending axially from the periphery of the clutch member 18 is a rim 23, having square sided clutch jaws 24, slidably engaging similar jaws 25 in a rim 26 of a driving disc 27. This disc is rigidly secured on a tapered portion of the shaft 6 by keys or splines 28 (Figure 2) and held in place by a threaded nut 30 having a lock wire 31.

A cupped packing ring 32, preferably of leather, is secured to the inner face 33 of the disc 27 by means of a keeper ring 34 and screws 35. The inner annular flange 36 of the packing ring 32 makes airtight connection at 37 with the hub, and the outer flange 38 forms airtight connections with the rim of the clutch member 18 at 39. Air ports 40 through the keeper ring 34 and packing ring 32 communicate with radial air ducts 41 in the disc leading to the shaft 6 and holes 42 registering with the ducts 41 are drilled in the shaft 6. The bore of this hollow shaft is outwardly tapered at each end of the shaft and internally threaded a short distance and tapered plugs 43 and 43$^a$ are secured into the ends of the shaft 6, making airtight connections therewith and passing some distance beyond the airholes 42.

An annular groove 45 is provided in the plug opposite the holes and one or more holes 46 are drilled in the bottom of this groove and communicate with an internal passageway 47 in the plug. This passageway is drilled from the outer end of the plug to just beyond the air holes and a stopper 48 is thereafter screwed into the passageway to close its open end. One or more holes are drilled through the plug at 49 and a collar 50 having an internal annular groove 51, registering with these holes, is arranged on the plug. Suitable packing nuts 52 and 53 are provided for the collar 50 to prevent leakage of air from the groove 51 and a nipple 54 projects from the collar to which a pipe 55 may be attached supplying air from any suitable compressed air source, not shown in the drawings. The plug rotating with the shaft 6, preferably has a bearing 56 supported on the machine frame and a threaded nut 57 holds the collar 50 in place on the plug.

I have shown means for reversing the revolution of the shaft 6 in connection with the operation of the two clutches, consisting of a driving pinion 58 on a shaft 59 meshing with the clutch gear 15$^a$.

A pinion 60 on the shaft 59 meshes with a gear 61 on a shaft 59$^a$, and this shaft drives the clutch member 7 in the opposite direction from the clutch member 7$^a$ through the pinion 62 meshing with the clutch gear 15. The shaft 59 is connected to a suitable source of power, not shown, and the shaft 6 is provided with a pinion 63 meshing with a gear 64 on a shaft 65 through which the working parts of the planer or other machine are operated. The attachment of this clutch invention to a planer or shaper platen is embodied in my co-pending application 334,213, filed October 24, 1919, and I make no claim in this case to such combination.

In operation, and assuming the shaft 6 is to be set in motion in a certain direction, air under pressure is admitted through the pipe 55, collar 50, plug passageway 47, holes 46 and 42, ducts 41 and ports 40, into the narrow annular chamber 66 between the keeper ring 34 and face of the clutch member 18. The pressure of the air reacting against the disc 27 and collar 30 forces the clutch member 18 into instant clutch engagement with the revolving clutch member 7 and through the jaw clutch members 24 and 25 and disc 27 the shaft 6 is caused to revolve in the required direction. When the shaft is to be reversed, the air is exhausted from the chamber 66 and admitted to the chamber 66$^a$ in the opposite clutch member 18$^a$ through pipe 55$^a$, collar 50$^a$, plug passageway 47$^a$, holes 46$^a$ and 42$^a$, ducts 41$^a$ and ports 40$^a$, and the air pressure reacting against the disc 27$^a$ and a collar 30$^a$, first instantly forces the clutch member 18 out of engagement with the clutch member 7 through the spacing rod 22 and immediately thereafter engages the clutch member 18$^a$ with the oppositely revolving clutch members 7$^a$, thus reversing the rotation of the shaft 6. This operation may alternate from one clutch to the other, as may be required by the nature of the work performed. The means for controlling the admission and exhaust of the air forms no part of the present invention but will be embodied in a separate application.

It will be seen by the mechanism above described that the operation of the movable clutch members into and out of engagement with the driving clutch member is particularly free and easy of accomplishment, as no spring tension is to be overcome and furthermore, the driving and sliding connection between the movable clutch member and the disc member carrying the load, being arranged about in line with the friction clutch and at a much greater radial distance from the center of rotation than is usually the case where the clutch member is splined directly to the load-carrying shaft, the pressure between the sliding surfaces is greatly reduced, thus further contributing to the ease and rapidity of the operation of the clutches.

As various modifications of the details of construction may be made without departing from the scope and principle of my invention, I do not therefore wish to confine myself strictly to the construction shown and described.

I claim as my invention:

1. The combination, with a shaft, of continuously revolving clutch members loosely mounted thereon, fixed clutch members mounted on said shaft, movable clutch members interposed between said loosely mounted members and said fixed members and having clutching engagement with said fixed members and mounted for movement toward and from said loosely mounted members, means for admitting fluid pressure to actuate said movable clutch members and means enclosed by said shaft and actuated by the movement of one movable clutch member for unseating the other movable clutch member.

2. The combination, with a shaft, of clutch members loosely mounted thereon, means for driving said members continuously, driving members secured on said shaft, movable clutch members between said loosely mounted members and said driving members and having driving connections with the latter, means for admitting a fluid pressure between said driving members and said movable members to seat the latter on said loosely mounted members, and a rod movable in said shaft and actuated by the seating of one movable member for positively unseating the other movable member.

3. The combination, with two clutch members and a hollow shaft whereon they are secured, of two clutch members loosely rotating on said shaft, a movable clutch member for each of said rotating clutch members, means for supplying and maintaining a fluid under pressure against the faces of said movable members, and a rod connecting said movable members through said hollow shaft.

4. The combination, with a hollow shaft, of two clutch members each loosely rotating on said shaft, a movable clutch member for each of said rotating clutch members, a driving member rigidly secured to said shaft for each of said movable clutch members, an annular abutment projecting from said driving members and embraced by said movable members, slidable clutching means between said movable and said driving members, means for supplying air under pressure through said driving members and against the faces of said movable members, and a connection through said hollow shaft between said movable members.

5. The combination, with a shaft, of two clutch members, each loosely rotating thereon, a movable clutch member for each of said rotating clutch members, a driving member rigidly secured to said shaft for each of said movable clutch members, each driving member having an annular abutment projecting therefrom and each movable clutch member having a rim encircling said abutment, said abutments and said rims having slidable clutching means between them, means for supplying air under pressure through said driving members and against the face of said movable members, and means actuated by the operation of one of said movable members for unseating the other movable member.

6. A clutch mechanism comprising a shaft, a rotating friction clutch member mounted on said shaft, a driving member rigidly connected to said shaft and having jaw clutch members near its periphery, an annular abutment arranged on the face of said driving member, a movable friction clutch member embracing said abutment, and having jaw clutch members overlapping said abutment and slidably engaging the jaw clutch members on said driving member, and means for admitting air under pressure through said driving member and said abutment against the face of said movable clutch member.

7. The combination, with a shaft, of two clutch members, each loosely rotating thereon, a movable clutch member for each of said rotating clutch members, a driving member secured to said shaft for each of said movable clutch members and having annular abutments projecting therefrom, and said movable clutch members having rims encircling said annular abutments and provided with means for sliding clutching engagement therewith, and means for supplying fluid under pressure through said driving members and against the face of said movable members.

8. The combination with a hollow shaft, of fluid pressure actuated forward and reverse clutches arranged at opposite ends of said shaft, a rod mounted in said shaft between said clutches and having its ends seated against the movable members of said clutches, said rod being actuated longitudinally by the seating of either clutch to engage the end of said rod with and unseat the opposite one.

9. The combination, with a shaft, of loosely mounted continuously revolving clutch members mounted thereon, fixed clutch members on said shaft, fluid pressure actuated clamping members having driving connections with said fixed members and mounted to engage and temporarily lock said loosely mounted members, and means operating through said shaft and actuated by the movement of one clamping member for unseating the other clamping member.

10. The combination, with a hollow shaft, of fluid pressure actuated forward and reverse clutches mounted upon opposite ends of said shaft, a rod extending continuously through said hollow shaft from one clutch to the other and actuated longitudinally by the seating of either clutch to unseat the other one.

11. The combination with a shaft, of fluid pressure actuated forward and reverse clutches oppositely arranged at opposite ends thereof and comprising fixed and movable members, means mounted parallel with said shaft between said clutches and having its ends seated against said movable members, said means being actuated longitudinally by the seating of either clutch to unseat the opposite one.

In witness whereof, I have hereunto set my hand this 17th day of October 1919.

CONRAD M. CONRADSON.

Witnesses:
B. L. PARKER,
ALICE M. HAWLEY.